(12) United States Patent
Watanabe et al.

(10) Patent No.: US 11,223,091 B2
(45) Date of Patent: Jan. 11, 2022

(54) ELECTRIC POWER STORAGE DEVICE

(71) Applicant: Toyota Jidosha Kabushiki Kaisha, Toyota (JP)

(72) Inventors: Kenta Watanabe, Toyota (JP); Nobuyoshi Fujiwara, Nagoya (JP); Koichi Umeda, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 189 days.

(21) Appl. No.: 16/268,906

(22) Filed: Feb. 6, 2019

(65) Prior Publication Data

US 2019/0252666 A1    Aug. 15, 2019

(51) Int. Cl.
| | |
|---|---|
| *H01M 10/00* | (2006.01) |
| *H01M 50/502* | (2021.01) |
| *H01M 10/04* | (2006.01) |
| *H01R 43/02* | (2006.01) |
| *H01M 10/42* | (2006.01) |
| *H01M 10/643* | (2014.01) |
| *H01M 50/20* | (2021.01) |
| *H01M 50/213* | (2021.01) |
| *H01M 50/572* | (2021.01) |

(52) U.S. Cl.
CPC ..... *H01M 50/502* (2021.01); *H01M 10/0413* (2013.01); *H01M 10/425* (2013.01); *H01M 10/643* (2015.04); *H01M 50/20* (2021.01); *H01M 50/213* (2021.01); *H01M 50/572* (2021.01); *H01R 43/0207* (2013.01); *H01R 43/0221* (2013.01)

(58) Field of Classification Search
CPC .... H01M 10/425; H01M 2/34; H01M 2/1077; H01M 10/0413; H01M 2/206
See application file for complete search history.

(56) References Cited

U.S. PATENT DOCUMENTS

| | | | |
|---|---|---|---|
| 2009/0108982 A1* | 4/2009 | Ohashi | H01H 85/044 337/191 |
| 2010/0116570 A1 | 5/2010 | Sugawara et al. | |
| 2016/0172652 A1* | 6/2016 | Ichikawa | H01M 2/206 429/121 |

(Continued)

FOREIGN PATENT DOCUMENTS

| | | |
|---|---|---|
| JP | 2004-319354 A | 11/2004 |
| JP | 2005-347158 A | 12/2005 |

(Continued)

*Primary Examiner* — Cynthia H Kelly
*Assistant Examiner* — Monique M Wills
(74) *Attorney, Agent, or Firm* — Dinsmore & Shohl LLP

(57) ABSTRACT

An electric power storage device includes at least one electric power storage cell having a first end provided with a first electrode, and a second end provided with a second electrode; a first electrode bus bar that is disposed on a side of the first end and is connected to the first electrode; and a second electrode bus bar that is disposed on a side of the second end and is connected to the second electrode. The first electrode bus bar is provided with a connection line connected to the first electrode. The first electrode bus bar and the second electrode bus bar are joined to each other by ultrasonic joining. A joint portion between the first electrode bus bar and the second electrode bus bar is disposed at a position that is closer to the second end than to the first end.

16 Claims, 7 Drawing Sheets

(56) References Cited

U.S. PATENT DOCUMENTS

2017/0214033 A1    7/2017   Takano et al.

FOREIGN PATENT DOCUMENTS

| JP | 2010-113999 A | 5/2010 |
| JP | 2016-066455 A | 4/2016 |
| JP | 2017-157509 A | 9/2017 |
| WO | 2016072054 A1 | 5/2016 |

* cited by examiner

ELECTRIC POWER STORAGE DEVICE

CROSS-REFERENCE TO RELATED APPLICATIONS

This application claims priority to Japanese Patent Application No. 2018-021636 filed on Feb. 9, 2018, which is incorporated herein by reference in its entirety including the specification, drawings and abstract.

BACKGROUND

1. Technical Field

The present disclosure relates to an electric power storage device.

2. Description of Related Art

An electric power storage device that includes a plurality of cylindrical cells has been known. For example, an electric power storage device disclosed in Japanese Patent Application Publication No. 2010-113999 (JP 2010-113999 A) includes a casing and a plurality of cylindrical cells housed in this casing.

The casing is formed in a substantially rectangular parallelepiped shape. The casing includes a pair of lateral plates. A bus bar is provided on an inner surface side of each of the lateral plates. The cylindrical cells are connected in series by the bus bars.

SUMMARY

In the electric power storage device described in the above-described related art, the cylindrical cells are connected in series. For example, it is conceivable to provide an electric power storage device in which the plurality of cylindrical cells are connected in parallel and the plurality of cylindrical cells connected in parallel are then connected in series.

The electric power storage device configured as described above includes the plurality of cylindrical cells, a positive electrode bus bar unit, and a negative electrode bus bar unit. The positive electrode bus bar unit includes a plurality of positive electrode bus bars, and the negative electrode bus bar unit includes a plurality of negative electrode bus bars.

Each of the positive electrode bus bars is provided with a plurality of positive electrode connection lines connected to positive electrodes of the cylindrical cells, and the positive electrode bus bars connect the positive electrodes of the plurality of cylindrical cells in parallel. Similarly, each of the negative electrode bus bars is provided with a plurality of negative electrode connection lines connected to negative electrodes of the cylindrical cells, and the negative electrode bus bars connect the negative electrodes of the plurality of cylindrical cells in parallel.

Then, the positive electrode bus bars and the negative electrode bus bars are connected such that a group of the cylindrical cells, which are connected in parallel by the positive electrode bus bars, and a group of the cylindrical cells, which are connected in parallel by the negative electrode bus bars, are connected in series.

For example, the positive electrode bus bar and the negative electrode bus bar are joined to each other. As a joining method, for example, laser welding, ultrasonic joining, or the like is considered.

When the positive electrode bus bar and the negative electrode bus bar are joined to each other by the laser welding, a melted portion of the bus bar may be spattered around the bus bar, depending on energy of a laser beam. For example, when the positive electrode bus bar and the negative electrode bus bar are joined to each other by the ultrasonic joining, it is possible to prevent a situation where, for example, the melted portion is spattered around the bus bar. Thus, it is conceivable to join the positive electrode bus bar and the negative electrode bus bar by the ultrasonic joining.

In order to prevent a situation where an amount of the current flowing from each of the cylindrical cells becomes excessive, it is conceivable to set, for example, shapes of the positive electrode connection lines such that each of the positive electrode connection lines functions as a fuse.

In the case where each of the positive electrode connection lines functions as the fuse, when the positive electrode bus bar and the negative electrode bus bar are joined to each other by the ultrasonic joining, a vibration at the time of the joining is transferred to each of the positive electrode connection lines as the fuse. As a result, the fuse may be broken, or the fuse and the cylindrical cell may be disconnected from each other.

As an example in which the positive electrode connection line is likely to be, for example, broken, the case where the positive electrode connection line functions as the fuse has been described. However, there is also a case where the positive electrode connection line is simply formed of a thin wire.

In the case where such a thin wire is used as the positive electrode connection line, the vibration at the time of joining the positive electrode bus bar and the negative electrode bus bar by the ultrasonic joining is transferred to the thin positive electrode connection line. As a result, the thin positive electrode connection line may be, for example, broken.

The description has been made on the various negative effects that may be caused in the positive electrode connection lines when the bus bars are joined in the case where each of the positive electrode connection lines functions as the fuse or each of the positive electrode connection lines is formed of the thin wire. The same problems may also occur in the negative electrode connection lines.

The present disclosure provides an electric power storage device which includes at least one electric power storage cell, a first electrode bus bar, and a second electrode bus bar, and in which the first electrode bus bar and the second electrode bus bar are joined to each other by ultrasonic joining, and a connection line that connects the first electrode bus bar and the at least one electric power storage cell is favorably connected.

An electric power storage device according to an aspect of the disclosure includes at least one electric power storage cell having a first end provided with a first electrode, and a second end provided with a second electrode; a first electrode bus bar that is disposed on a side of the first end of the at least one electric power storage cell and is connected to the first electrode of the at least one electric power storage cell; and a second electrode bus bar that is disposed on a side of the second end of the at least one electric power storage cell and is connected to the second electrode of the at least one electric power storage cell. The first electrode bus bar is provided with a connection line that is connected to the first electrode. The first electrode bus bar and the second electrode bus bar are joined to each other by ultrasonic joining. A joint portion between the first electrode bus bar and the second electrode bus bar is disposed at a position that is closer to the second end of the at least one electric power storage cell than to the first end of the at least one electric power storage cell.

In the above electric power storage device, when the first electrode bus bar and the second electrode bus bar are joined to each other by the ultrasonic joining, the joint portion between the first electrode bus bar and the second electrode bus bar is disposed at the position that is closer to the second end of the at least one electric power storage cell than to the first end thereof. Therefore, a vibration transfer distance, through which vibrations applied to the first electrode bus bar are transferred to reach the connection line, can be made long. In other words, vibrations applied to the first electrode bus bar at the time of the ultrasonic joining are transferred through a long distance to reach the connection line. Since the vibration transfer distance is made long, the vibrations that are transferred to the connection line can be reduced to small vibrations.

A thickness of the first electrode bus bar may be smaller than a thickness of the second electrode bus bar. Since the thickness of the first electrode bus bar is small, it is possible to reduce propagation of the vibrations through the first electrode bus bar.

In the electric power storage device, the first electrode bus bar may include a body portion that is disposed on the side of the first end of the at least one electric power storage cell; and an extending portion that extends from the body portion toward the second electrode bus bar and is joined to the second electrode bus bar by the ultrasonic joining. The joint portion between the first electrode bus bar and the second electrode bus bar may be formed by applying a vibration in a direction that intersects with an extending direction of the extending portion.

In the above electric power storage device, an amplitude direction of the vibrations and the extending direction of the extending portion intersect with each other. Thus, a direction in which the vibrations are likely to propagate and a vibration transfer direction at the time when the vibrations pass through the extending portion intersect with each other. Therefore, it is possible to reduce the possibility that the large vibrations pass through the extending portion.

The first electrode bus bar may include a body portion that is disposed on the side of the first end of the at least one electric power storage cell; and an extending portion that extends from the body portion toward the second electrode bus bar and is joined to the second electrode bus bar by the ultrasonic joining. The joint portion may be formed at an end of the extending portion.

In the above electric power storage device, a length of a transfer path for the vibrations (i.e., a length of a path through which the vibrations are transferred) can be made long. Thus, the vibrations that are transferred to the connection line can be reduced to small vibrations.

The first electrode bus bar may include a body portion that is disposed on the side of the first end of the at least one electric power storage cell; and an extending portion that extends from the body portion toward the second electrode bus bar and is joined to the second electrode bus bar by the ultrasonic joining. In the body portion, a hole may be provided at a position that faces the first end of the at least one electric power storage cell. The connection line may be disposed in the hole. The connection line may include a base portion that is connected to an inner peripheral edge of the hole. In the base portion, the connection line may extend in a direction toward the extending portion.

The propagation characteristics of high-frequency vibrations that are applied at the time of the ultrasonic joining include high straightness, that is, the high-frequency vibrations that are applied at the time of the ultrasonic joining are highly likely to propagate straight. Thus, the high-frequency vibrations are unlikely to be diffracted. Accordingly, the vibrations that have reached the body portion from the extending portion propagate from a connection portion between the extending portion and the body portion in a direction away from the extending portion. Meanwhile, the connection line extends from the base portion in the direction toward the extending portion. Thus, the direction in which the vibrations are likely to propagate is different from an extending direction of the connection line from the base portion (i.e., a direction in which the connection line extends from the base portion). As a result, it is possible to reduce the possibility that the vibrations transferred to the body portion enter the inside of the connection line from the base portion of the connection line.

According to the above-described aspect of the present disclosure, the electric power storage device includes the at least one electric power storage cell, the first electrode bus bar, and the second electrode bus bar, and in the electric power storage device, the first electrode bus bar and the second electrode bus bar are joined to each other by the ultrasonic joining, and the connection line is favorably connected to the at least one electric power storage cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
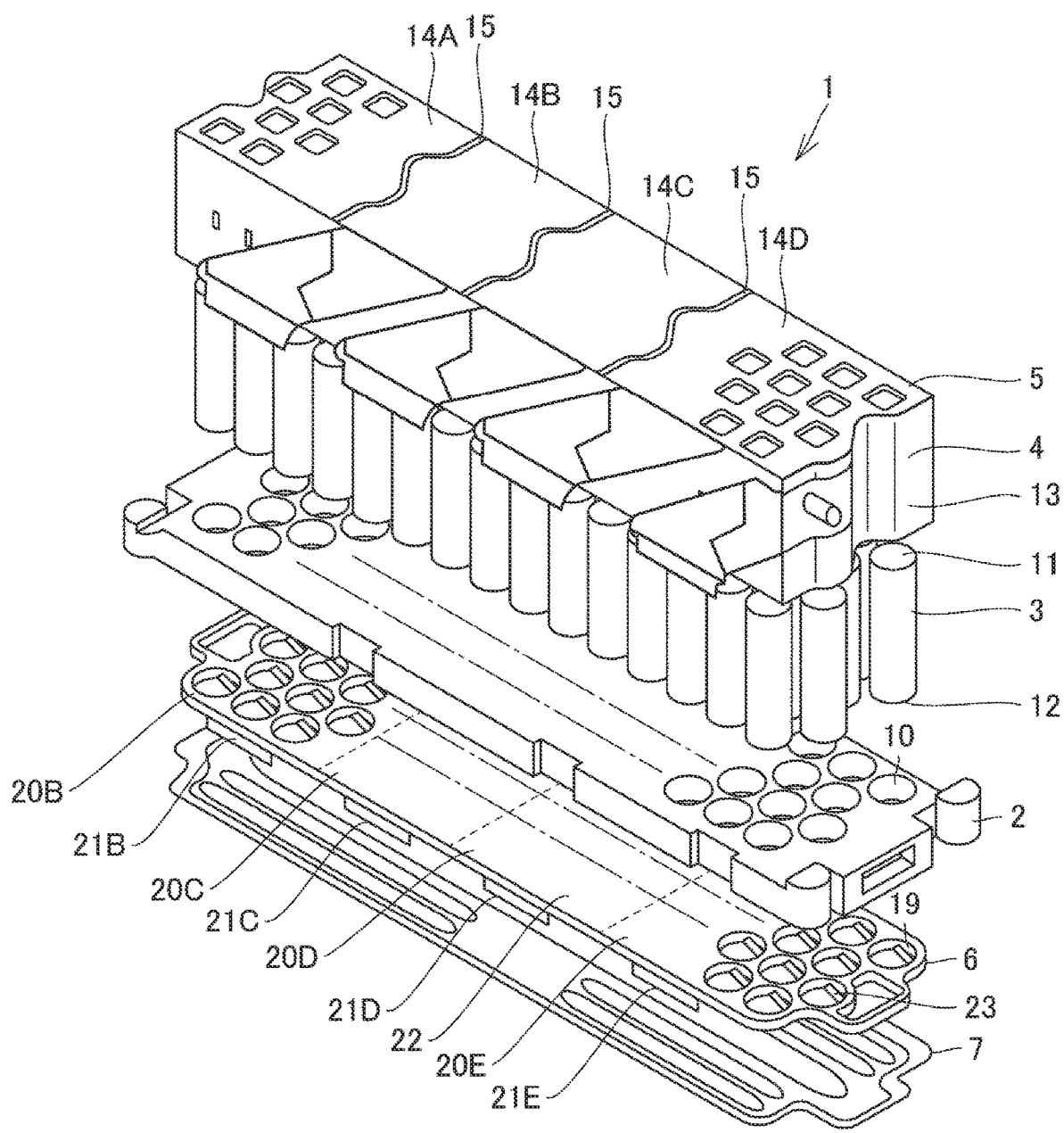
FIG. 1 is a perspective view of an electric power storage device 1 according to an embodiment.

A description will be provided on an electric power storage device according to an embodiment with the use of FIG. 1 to FIG. 9. With regard to components shown in FIG. 1 to FIG. 9, the same or substantially the same components are denoted by the same reference numerals, and an overlapping description thereon will not be made.

FIG. 1 is a perspective view of an electric power storage device 1 according to this embodiment. The electric power storage device 1 includes a holder 2, a plurality of cylindrical cells 3, a resin case 4, a positive electrode bus bar unit 5, a negative electrode bus bar unit 6, and a bottom surface cover 7.

The holder 2 is formed in a plate shape, and the holder 2 is formed of metal or the like. A plurality of through-holes 10 are formed in the holder 2.

Each of the cylindrical cells 3 as battery cells is inserted in the through-hole 10, and each of the cylindrical cells 3 includes a positive electrode 11 and a negative electrode 12. The positive electrode 11 is formed on an upper end (a first end) of the cylindrical cell 3, and the negative electrode 12 is formed on a lower end (a second end) of the cylindrical cell 3. Note that each of the cylindrical cells 3 is inserted in the through-hole 10 so as to project upward from an upper surface of the holder 2.

The resin case 4 is disposed on the upper surface of the holder 2, and the resin case 4 is formed to be opened downward. The resin case 4 is formed in a substantially rectangular parallelepiped shape, and the resin case 4 includes a peripheral wall portion 13 and a top plate portion. Note that, because the positive electrode bus bar unit 5 is formed on the top plate portion in FIG. 1, the top plate portion is not shown.

The peripheral wall portion 13 is formed to extend downward from an outer peripheral edge of the top plate portion. A lower end of the peripheral wall portion 13 is disposed on the upper surface of the holder 2. The peripheral wall portion 13 is formed to surround the plurality of cylindrical cells 3 from above.

The positive electrode bus bar unit 5 is disposed on the top plate portion of the resin case 4. The positive electrode bus bar unit 5 includes a plurality of positive electrode bus bars 14A, 14B, 14C, 14D. Note that each of the positive electrode bus bars 14A, 14B, 14C, 14D is formed of aluminum or an aluminum alloy.

The positive electrode bus bars 14A, 14B, 14C, 14D are disposed so as to be arranged in a longitudinal direction of the resin case 4, and each of the positive electrode bus bars 14A, 14B, 14C, 14D is fixed to the top plate portion of the resin case 4. Note that the positive electrode bus bars 14A, 14B, 14C, 14D are disposed at intervals. Clearances 15 are provided among the positive electrode bus bars 14A, 14B, 14C, 14D. That is, the clearance 15 is provided between the positive electrode bus bars 14A and 14B, the clearance 15 is provided between the positive electrode bus bars 14B and 14C, and the clearance 15 is provided between the positive electrode bus bars 14C and 14D. A detailed configuration of the positive electrode bus bar unit 5 will be described below.

The negative electrode bus bar unit 6 is disposed on a lower surface-side of the holder 2, and the negative electrode bus bar unit 6 is formed in a plate shape. The negative electrode bus bar unit 6 is formed in a substantially rectangular shape, and an outer peripheral edge of the negative electrode bus bar unit 6 includes a pair of long sides.

The negative electrode bus bar unit 6 is provided with a plurality of through-holes 19, and the through-holes 19 are formed so as to extend through the negative electrode bus bar unit 6 from an upper surface to a lower surface.

The negative electrode bus bar unit 6 includes a plurality of negative electrode bus bars 20B, 20C, 20D, 20E, a plurality of joint pieces 21B, 21C, 21D, 21E, a mold resin 22, and a plurality of connection lines 23. Each of the negative electrode bus bars 20B, 20C, 20D, 20E is formed of copper, a copper alloy, or the like.

The mold resin 22 fixes the negative electrode bus bars 20B, 20C, 20D, 20E integrally, and the negative electrode bus bars 20B, 20C, 20D, 20E are electrically insulated from each other by the mold resin 22.

Each of the joint pieces 21B, 21C, 21D, 21E is formed on one of the long sides of the negative electrode bus bar unit 6 and is formed so as to project downward from the lower surface of the negative electrode bus bar unit 6.

The joint piece 21B is connected to the negative electrode bus bar 20B. Similarly, the joint pieces 21C, 21D, 21E are respectively connected to the negative electrode bus bars 20C, 20D, 20E.

One end of each of the connection lines 23 is connected to one of the negative electrode bus bars 20B, 20C, 20D, 20E, and the other end of each of the connection lines 23 is located in the through-hole 19. The other end of each of the connection lines 23 is connected to the negative electrode 12 of the cylindrical cell 3.

The negative electrode bus bar 20B is provided with the plurality of connection lines 23, and the plurality of cylindrical cells 3 are connected in parallel by the negative electrode bus bar 20B.

Similarly, each of the negative electrode bus bars 20C, 20D, 20E is provided with the plurality of connection lines 23, and the plurality of cylindrical cells 3 are connected in parallel by each of the negative electrode bus bars 20C, 20D, 20E.

The bottom surface cover 7 is disposed on the lower surface-side of the negative electrode bus bar unit 6. The bottom surface cover 7 is fixed to the holder 2, and a smoke passage is formed between the bottom surface cover 7 and the negative electrode bus bar unit 6.

Figure 2:
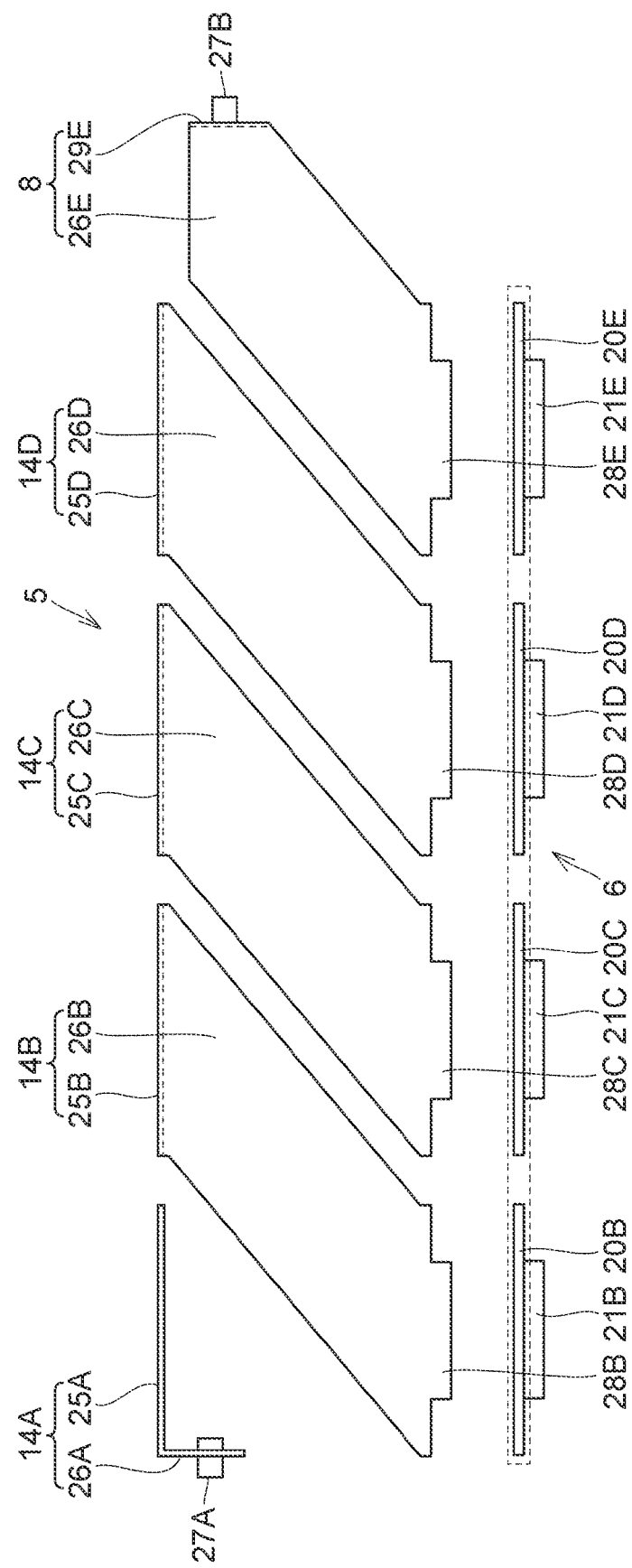
FIG. 2 is an exploded side view that schematically shows a positive electrode bus bar unit 5 and a negative electrode bus bar unit 6.

FIG. 2 is an exploded side view that schematically shows the positive electrode bus bar unit 5 and the negative electrode bus bar unit 6.

The positive electrode bus bar 14A includes a body portion 25A and an end plate 26A. The body portion 25A is formed in a plate shape and is disposed on the top plate portion of the resin case 4. The end plate 26A extends downward from an edge side of the body portion 25A and is disposed on an end surface of the resin case 4. An external terminal 27A is connected to the end plate 26A. The external terminal 27A is a terminal to which a cable connected to another electric power storage device 1 or the like, or the like is connected. The negative electrode bus bar 20B is disposed below the body portion 25A of the positive electrode bus bar 14A.

The positive electrode bus bar 14B includes a body portion 25B and a lateral plate 26B. The body portion 25B is formed in a plate shape and is disposed on the top plate portion of the resin case 4. The lateral plate 26B is formed to extend from a lateral side of the body portion 25B toward the negative electrode bus bar 20B, and the lateral plate 26B is disposed on a lateral surface of the resin case 4. A joint piece 28B is formed on a lower end (an end on the negative electrode bus bar 20B-side) of the lateral plate 26B.

The lateral plate 26B is formed to be obliquely inclined in a direction from the body portion 25B-side toward the joint piece 28B and is inclined toward the negative electrode bus bar 20B in the direction toward the joint piece 28B. The joint piece 28B and the joint piece 21B are joined to each other by ultrasonic joining.

Note that the negative electrode bus bars 20C, 20D, 20E are disposed below the body portions 25B, 25C, 25D of the positive electrode bus bars 14B, 14C, 14D.

The positive electrode bus bars 14C, 14D are each formed similarly to the positive electrode bus bar 14B. The positive electrode bus bars 14C, 14D respectively include the body portions 25C, 25D and lateral plates 26C, 26D. Joint pieces 28C, 28D are respectively formed at lower ends of the lateral plates 26C, 26D, and the joint pieces 28C, 28D are respectively joined to the joint pieces 21C, 21D by the ultrasonic joining.

A connection member 8 is disposed at a position adjacent to the lateral plate 26D of the positive electrode bus bar 14D. The connection member 8 includes a lateral plate 26E and an end plate 29E. The end plate 29E is disposed on the end surface of the resin case 4, and the end plate 29E is connected to an external terminal 27E. Note that, in this embodiment, the lateral plate 26B (including the joint piece 28B), the lateral plate 26C (including the joint piece 28C), and the lateral plate 26D (including the joint piece 28D) each correspond to the "extending portion".

The lateral plate 26E is connected to the end plate 29E and is disposed on the lateral surface of the resin case 4. The lateral plate 26E is also inclined toward the negative electrode bus bar 20E in a direction from an upper end side toward a lower end side. A joint piece 28E is formed on the lower end of the lateral plate 26E. That is, the lateral plate 26E is inclined toward the negative electrode bus bar 20E in a direction toward the joint piece 28E. The joint piece 28E is joined to the joint piece 21E of the negative electrode bus bar 20E by the ultrasonic joining.

The bus bars are connected as described above. In this way, the plurality of cylindrical cells 3, which are connected in parallel by the body portion 25A of the positive electrode bus bar 14A and the negative electrode bus bar 20B, and the plurality of cylindrical cells 3, which are connected in parallel by the body portion 25B of the positive electrode bus bar 14B and the negative electrode bus bar 20C, are connected in series by the lateral plate 26B of the positive electrode bus bar 14B.

Similarly, the plurality of cylindrical cells 3, which are connected in parallel by the body portion 25B and the negative electrode bus bar 20C, and the plurality of cylindrical cells 3, which are connected in parallel by the body portion 25C and the negative electrode bus bar 20D, are connected in series by the lateral plate 26C.

The plurality of cylindrical cells 3, which are connected in parallel by the body portion 25C and the negative electrode bus bar 20D, and the plurality of cylindrical cells 3, which are connected in parallel between the body portion 25D and the negative electrode bus bar 20E, are connected in series by the lateral plate 26D.

Figure 3:
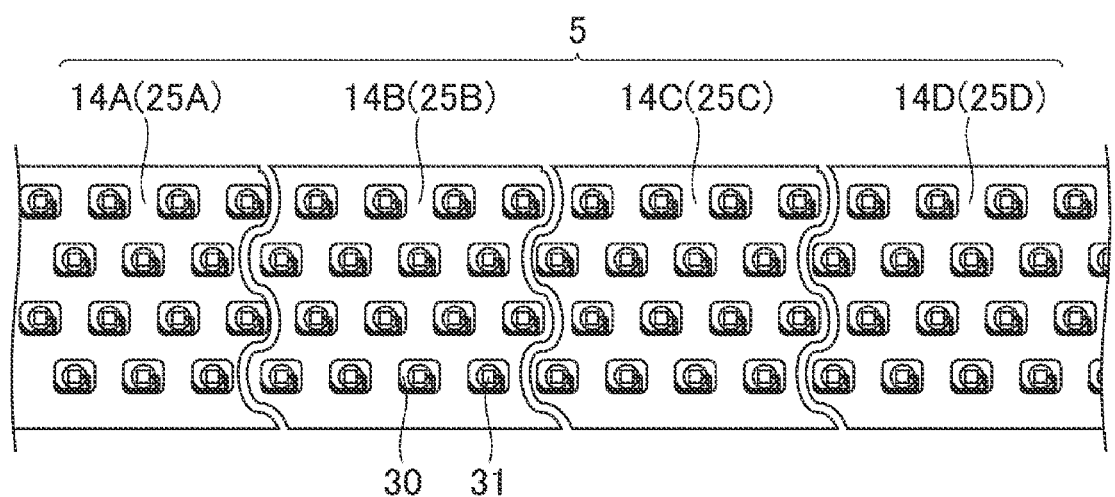
FIG. 3 is a plan view of the positive electrode bus bar unit 5.

FIG. 3 is a plan view of the positive electrode bus bar unit 5. A plurality of holes 30 are formed in each of the body portions 25A, 25B, 25C, 25D of the positive electrode bus bars 14A, 14B, 14C, 14D. A connection line 31 is provided in each of the holes 30.

Figure 4:
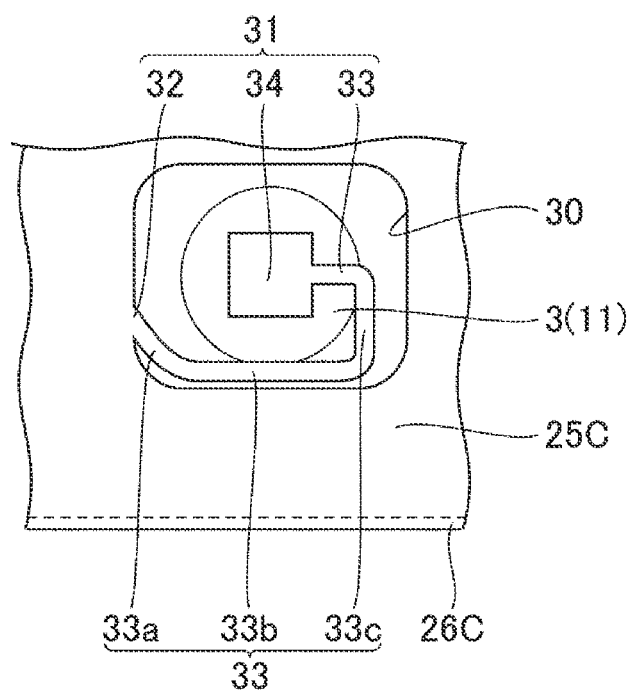
FIG. 4 is a plan view of a hole 30, a connection line 31, and a configuration in the vicinity of the hole 30 and the connection line 31.

FIG. 4 is a plan view of the hole 30, the connection line 31, and a configuration in the vicinity of the hole 30 and the connection line 31. The connection line 31 includes a line 33 and a welded piece 34. A base portion 32 of the line 33 is connected to an inner peripheral surface of the hole 30. The other end of the line 33 is connected to the welded piece 34. In the body portion 25C, each of the holes 30 is formed at a position that faces the positive electrode 11 of the cylindrical cell 3, and the welded piece 34 is welded to the positive electrode 11 of the cylindrical cell 3. Note that, as a welding method for the welded piece 34 and the positive electrode 11, resistance welding or the like can be adopted.

The line 33 includes line portions 33a, 33b, 33c. The line portion 33a extends toward the lateral plate 26C in a direction away from the base portion 32.

The line portion 33b extends along an inner peripheral edge of the hole 30, and the line portion 33c is curved from an end of the line portion 33b and is connected to the welded piece 34.

Note that the line 33 of the connection line 31 has a smaller cross-sectional area than that of the connection line 23 provided in the negative electrode bus bar unit 6. Accordingly, in the case where the same amount of current flows through the connection line 23 and the connection line 31, a temperature of the connection line 31 is likely to become higher than that of the connection line 23, and thus the connection line 31 is likely to be broken before the connection line 23 is broken.

That is, the connection line 31 functions as a fuse that is broken when the amount of the current flowing into and out of the cylindrical cell 3 becomes larger, than a specified value, so as to protect the cylindrical cell 3.

Figure 5:
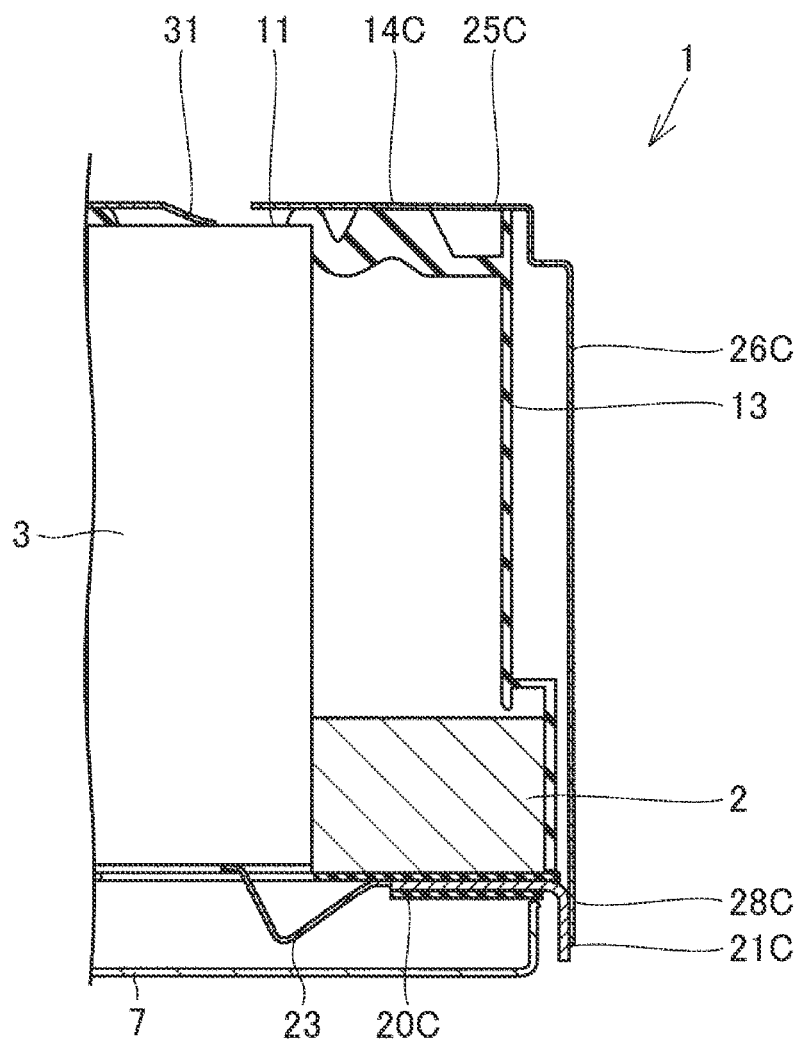
FIG. 5 is a sectional view of the electric power storage device 1.

FIG. 5 is a sectional view of the electric power storage device 1. Note that this sectional view shown in FIG. 5 is a sectional view illustrating a section that passes through the positive electrode bus bar 14C and the negative electrode bus bar 20C. As shown in this FIG. 5, the joint piece 28C of the positive electrode bus bar 14C is joined to the joint piece 21C of the negative electrode bus bar 20C.

Figure 6:
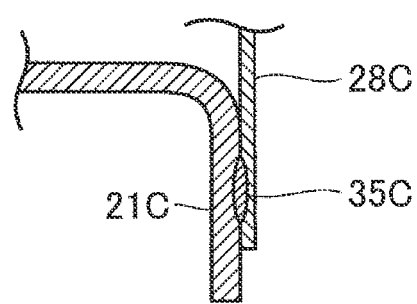
FIG. 6 is a sectional view of a joint piece 21C and a joint piece 28C.
Figure 7:
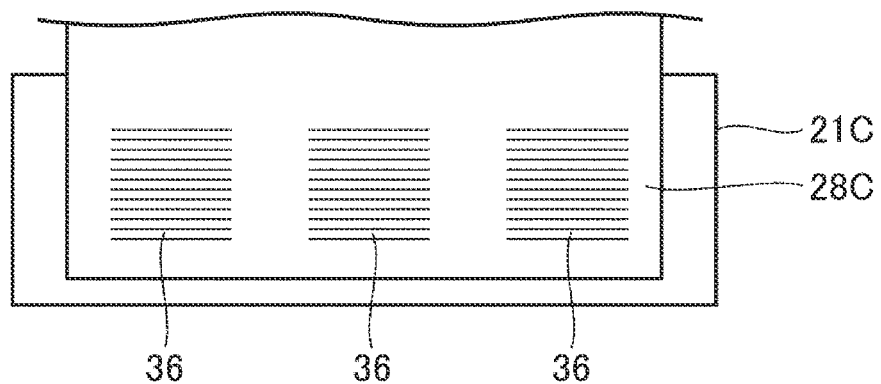
FIG. 7 is a front view of the joint piece 28C and the joint piece 21C in which joint marks 36 are left in the joint piece 28C.

FIG. 6 is a sectional view of the joint piece 21C and the joint piece 28C. Due to a joint layer 35C that is formed in a boundary surface between the joint piece 21C and the joint piece 28C, the joint piece 28C and the joint piece 21C are joined to each other. FIG. 7 is a front view of the joint piece 28C and the joint piece 21C in which joint marks 36 are left in the joint piece 28C. The joint marks 36 are a plurality of scars, each of which extends in the longitudinal direction of the resin case 4.

Figure 8:
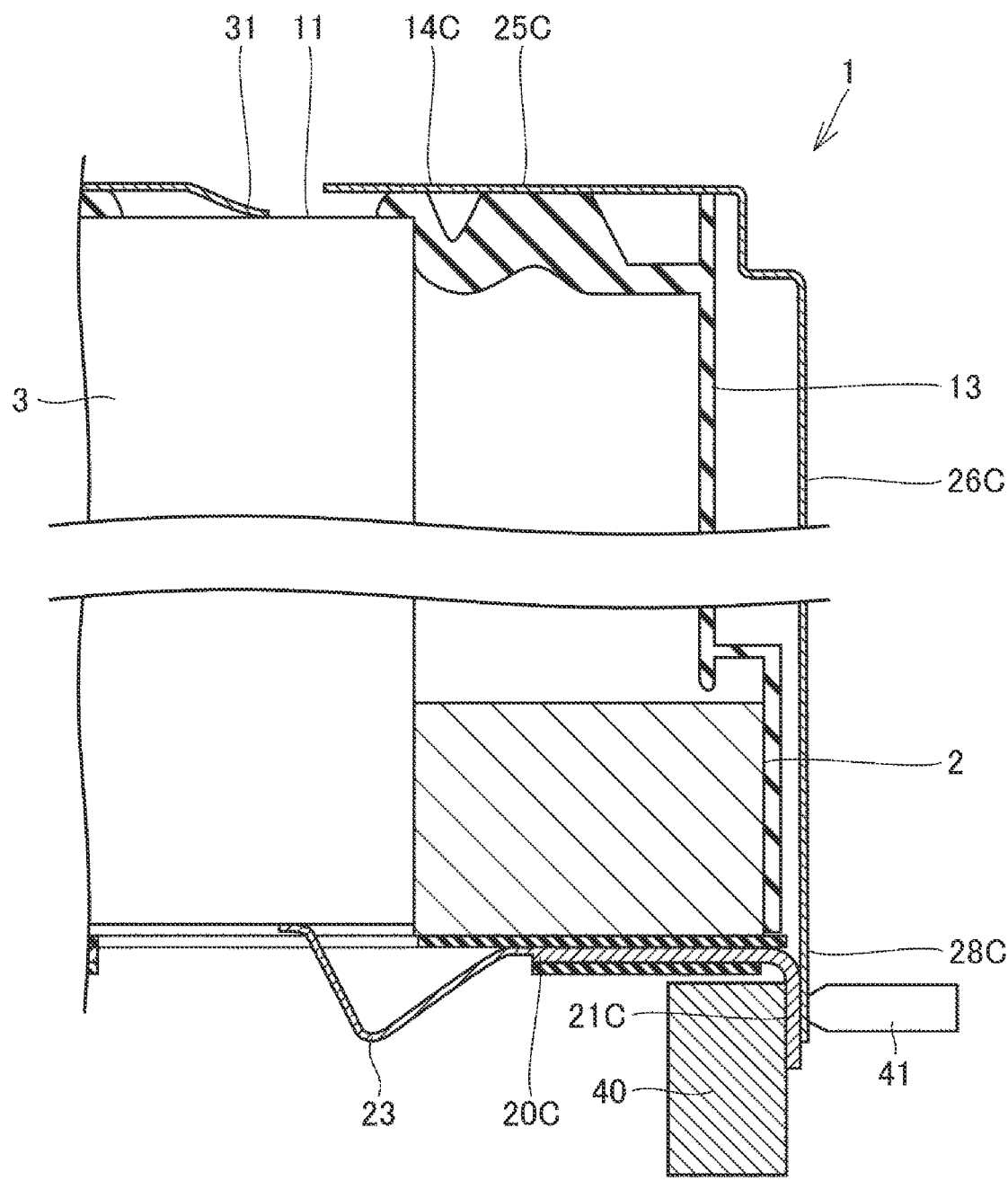
FIG. 8 is a sectional view of a situation where the joint piece 28C and the joint piece 21C are joined to each other by ultrasonic joining.

FIG. 8 is a sectional view illustrating a situation where the joint piece 28C and the joint piece 21C are joined to each other by the ultrasonic joining. When the joint piece 28C and the joint piece 21C are joined to each other by the ultrasonic joining, the joint piece 28C and the joint piece 21C are caused to come into contact with each other. Then, a support 40 is disposed on a back surface of the joint piece 21C, and the joint piece 28C is pressed by a horn 41.

Thereafter, the horn 41 starts vibrating. The horn 41 vibrates in the longitudinal direction of the resin case 4, and a frequency of the horn 41 is substantially equal to or higher than 15 kHz and equal to or lower than 60 kHz, for example. Note that, when micro joining as a kind of the ultrasonic joining is performed, the frequency of the horn 41 is approximately several hundred kHz, for example.

In the case where the joint piece 21C and the joint piece 28C are joined to each other by the ultrasonic joining (including the micro joining), the joint piece 21C and the joint piece 28C can be joined to each other at a temperature lower than melting temperatures of the joint piece 21C and the joint piece 28C. Accordingly, unlike laser welding and the like, it is possible to reduce the possibility that melted portions or the like are spattered (scattered) in the vicinity. In addition, it is possible to reduce the possibility that the joint piece 21C and the joint piece 28C are deformed by heat.

The ultrasonic joining is suited for joining of copper and aluminum. The joint piece 21C is formed of copper or the copper alloy, and the joint piece 28C is formed of aluminum or the aluminum alloy. Thus, the joint piece 21C and the joint piece 28C are favorably (appropriately) joined to each other by the ultrasonic joining.

When the joint piece 21C and the joint piece 28C are joined to each other by the ultrasonic joining, the vibrations whose frequency is substantially equal to or higher than 15 kHz and equal to or lower than 60 kHz or approximately several hundred kHz are applied to the joint piece 28C.

Since the joint piece 28C is formed at the lower end of the lateral plate 26C, the vibrations that are applied to the joint piece 28C are also transferred to the lateral plate 26C. Then, the vibrations that are transferred to the lateral plate 26C are further transferred to the body portion 25C.

Here, the joint piece 28C, to which the vibrations are applied, is formed at the lower end of the lateral plate 26C, and length of a transfer path through which the vibrations reach the body portion 25C is long. Thus, it is possible to reduce the possibility that the vibrations applied to the joint piece 28C are transferred to the body portion 25C.

The direction of the vibrations that are applied to the joint piece 28C from the horn 41 is the longitudinal direction of the resin case 4 (a horizontal direction). In general, the vibrations are likely to propagate in an amplitude direction of the vibrations. In the case where the horn 41 vibrates in the horizontal direction, the vibrations thereof are likely to propagate in the horizontal direction.

When the vibrations propagate to the body portion 25C, the vibrations pass through the lateral plate 26C. The lateral plate 26C extends so as to be inclined obliquely upward in a direction from the joint piece 28C toward the body portion 25C. Accordingly, the direction in which the vibrations are likely to propagate and the direction in which the transfer path for the vibrations extends intersect with each other. Thus, it is possible to reduce the possibility that the vibrations applied to the joint piece 28C are transferred to the body portion 25C. That is, in this embodiment, the horn 41 applies the vibrations to the joint piece 28C in the direction that intersects with the extending direction of the lateral plate 26C, and the vibrations that are transferred to the body portion 25C are reduced to small vibrations.

Furthermore, the thickness of the positive electrode bus bar 14C is smaller than the thickness of the negative electrode bus bar 20C. In general, when the thickness of a metal plate is small, the vibrations are less likely to propagate. Thus, it is possible to reduce the possibility that the vibrations reach the body portion 25C.

Thus, it is possible to reduce the possibility that the vibrations propagate to the body portion 25C. Therefore, it is possible to reduce the possibility that the vibrations are applied to the connection lines 31. Because it is possible to reduce the possibility that the connection lines 31 vibrate, it is possible to reduce the possibility that the connection lines 31 are broken or the connection lines 31 are detached from the positive electrodes 11.

In FIG. 4, it is assumed that the vibrations are transferred from the lateral plate 26C to the body portion 25C. The frequency of the vibrations at the time of the ultrasonic joining is substantially equal to or higher than 15 kHz and equal to or lower than 60 kHz, or approximately several hundred kHz. A propagation mode in which such high-frequency vibrations propagate through the metal plate has high straightness, that is, such high-frequency vibrations are highly likely to propagate straight. Thus, the high-frequency vibrations are unlikely to be diffracted. Then, the vibrations transferred to the body portion 25C mainly propagate through the body portion 25C in a direction away from the lateral plate 26C. Meanwhile, the line portion 33a of each of the lines 33 extends from the base portion 32 toward the lateral plate 26C.

Accordingly, the vibrations that are transferred from the lateral plate 26C to the body portion 25C are unlikely to reach each of the line portions 33a from the base portion 32 of the connection line 31, and thus the connection line 31 is unlikely to vibrate. As a result, it is possible to reduce the possibility that the connection lines 31 are broken or the connection lines 31 are detached from the positive electrodes 11.

The detailed description has been provided on the case where the joint piece 21C and the joint piece 28C are joined to each other by the ultrasonic joining. In addition, the joint piece 28B and the joint piece 21B as well as the joint piece 28D and the joint piece 21D are also joined to each other by the ultrasonic joining. Thus, it is also possible to reduce the possibility that the connection lines 31 provided in the positive electrode bus bar 14B and the positive electrode bus bar 14D are, for example, broken.

Note that, in this embodiment, a joint portion between the positive electrode bus bar 14C and the negative electrode bus bar 20C is formed on the side of the negative electrode 12 of each of the cylindrical cells 3. However, the position of the joint portion is not limited to the above position.

Figure 9:
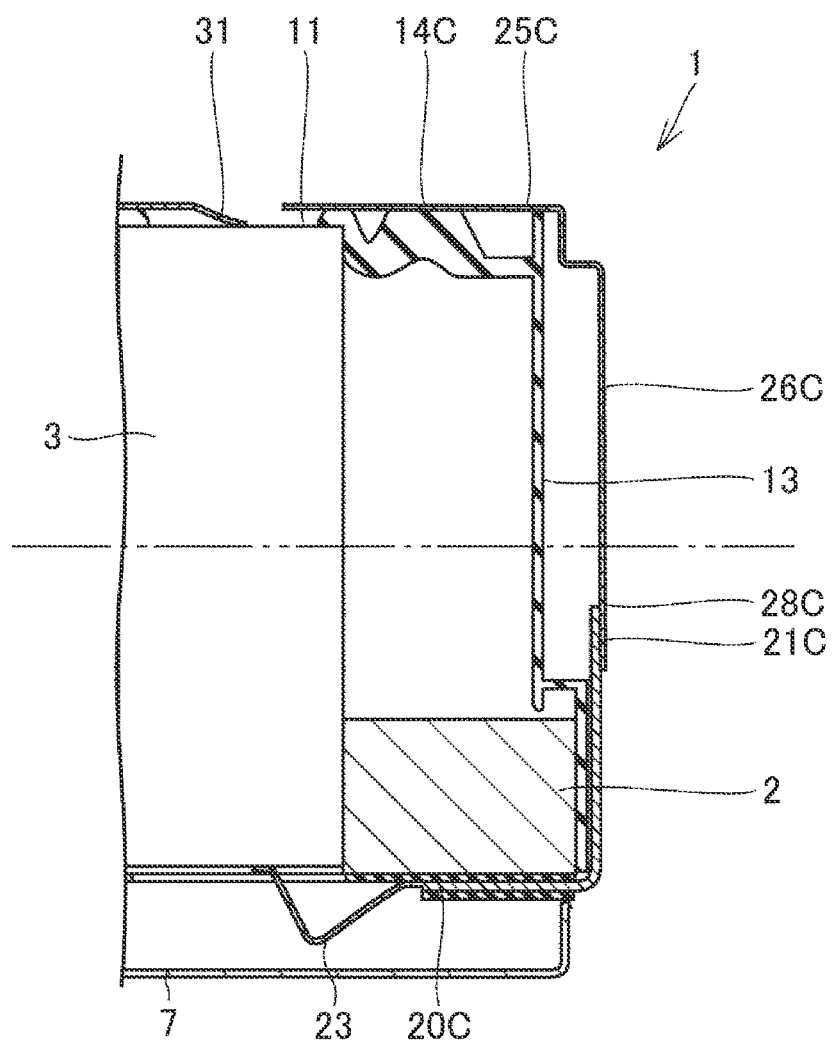
FIG. 9 is a cross-sectional view of a modified example of the electric power storage device.

FIG. 9 is a sectional view of a modified example of the electric power storage device. In the example shown in FIG. 9, the joint piece 21C of the negative electrode bus bar 20C is formed so as to extend upward from a lateral side of the negative electrode bus bar 20C. In addition, the joint portion between the joint piece 21C and the joint piece 28C is located closer to the negative electrode 12 of the cylindrical cell 3 than to the positive electrode 11 of the cylindrical cell 3. Note that an alternate long and two short dashes line shown in FIG. 9 is an imaginary line that extends through an intermediate position between the positive electrode 11 and the negative electrode 12 of the cylindrical cell 3.

Thus, when the joint portion between the joint piece 21C and the joint piece 28C is disposed on the side of the negative electrode 12, it is possible to secure the long transfer path for the vibrations at the time of the ultrasonic joining. Thus, it is possible to reduce the possibility that the connection lines 31 are, for example, broken.

In the above embodiment, each of the connection lines 31 provided in the positive electrode bus bar unit 5 functions as the fuse. However, the present disclosure can be also applied to the electric power storage device in which each of the connection lines 23 provided in the negative electrode bus bar unit 6 functions as the fuse.

In this case, a lateral plate is formed in each of the negative electrode bus bars 20B, 20C, 20D of the negative electrode bus bar unit 6, and each of the lateral plates extends to the vicinity of a lateral side of the positive electrode bus bar unit 5. Then, each of the lateral plates of the negative electrode bus bar unit 6 and corresponding one of the positive electrode bus bars are joined to each other by the ultrasonic joining.

When the positive electrode bus bar unit 5 and the negative electrode bus bar unit 6 are joined to each other in the above-described manner, it is possible to reduce the possibility that the connection lines 23 functioning as the fuses are, for example, broken.

The description has been provided on the case where the connection lines 31 or the connection lines 23 functions as the fuses. However, the present disclosure can be also applied to the electric power storage device in which each of the connection lines 31 or each of the connection lines 23 is formed of a thin wire. A cross-sectional diameter of the wire is equal to or larger than 0.1 mm and equal to or smaller than 1 mm.

In the case where each of the connection lines 31 is formed of the thin wire, the joint portions between the positive electrode bus bars 14B, 14C, 14D and the negative electrode bus bars 20B, 20C, 20D are disposed on the side of the negative electrode 12 of each of the cylindrical cells 3. In this way, it is possible to reduce the possibility that the connection lines 31 are broken. Note that, in the above embodiment, the cylindrical cells are employed as electric power storage cells. However, the electric power storage cells may be the battery cells other than the cylindrical cells. In addition, the electric power storage cells are not limited to the battery cells, and may be capacitors.

It should be understood that the embodiments disclosed herein are illustrative in all respects and not restrictive. Various modifications and changes made to the above-described embodiments are included in the scope of the disclosure. Furthermore, the above-described numerical values and the like are illustrative, and the numerical values and the like are not limited to the numerical values and the value ranges described above.

What is claimed is:

1. An electric power storage device comprising:
   at least one electric power storage cell having a first end provided with a first electrode, and a second end provided with a second electrode;
   a first electrode bus bar that is disposed on a side of the first end of the at least one electric power storage cell and is connected to the first electrode of the at least one electric power storage cell; and
   a second electrode bus bar that is disposed on a side of the second end of the at least one electric power storage cell and is connected to the second electrode of the at least one electric power storage cell, wherein
   the first electrode bus bar is provided with a connection line that is directly connected to the first electrode,
   the first electrode bus bar and the second electrode bus bar are joined to each other by ultrasonic joining, and
   a joint portion between the first electrode bus bar and the second electrode bus bar is disposed at a position that is closer to the second end of the at least one electric power storage cell than to the first end of the at least one electric power storage cell.

2. The electric power storage device according to claim 1, wherein a thickness of the first electrode bus bar is smaller than a thickness of the second electrode bus bar.

3. The electric power storage device according to claim 1, wherein:
   the first electrode bus bar includes
      a body portion that is disposed on the side of the first end of the at least one electric power storage cell, and
      an extending portion that extends from the body portion toward the second electrode bus bar and is joined to the second electrode bus bar by the ultrasonic joining; and
   the joint portion between the first electrode bus bar and the second electrode bus bar is formed by applying a vibration in a direction that intersects with an extending direction of the extending portion.

4. The electric power storage device according to claim 1, wherein:
   the first electrode bus bar includes
      a body portion that is disposed on the side of the first end of the at least one electric power storage cell, and
      an extending portion that extends from the body portion toward the second electrode bus bar and is joined to the second electrode bus bar by the ultrasonic joining; and
   the joint portion is formed at an end of the extending portion.

5. The electric power storage device according to claim 1, wherein:
   the first electrode bus bar includes
      a body portion that is disposed on the side of the first end of the at least one electric power storage cell, and
      an extending portion that extends from the body portion toward the second electrode bus bar and is joined to the second electrode bus bar by the ultrasonic joining;
   in the body portion, a hole is provided at a position that faces the first end of the at least one electric power storage cell;
   the connection line is disposed in the hole;
   the connection line includes a base portion that is connected to an inner peripheral edge of the hole; and
   in the base portion, the connection line extends in a direction toward the extending portion.

6. The electric power storage device according to claim 1, wherein the first end of the at least one electric power storage cell is opposite the second end of the at least one electric power storage cell.

7. The electric power storage device according to claim 1, wherein:
   the first electrode has a first polarity, and
   the second electrode has an opposite second polarity.

8. The electric power storage device according to claim 1, wherein:
   the first electrode bus bar is directly connected to the first electrode of the at least one electric power storage cell; and
   the second electrode bus bar is directly connected to the second electrode of the at least one electric power storage cell.

9. An electric power storage device comprising:
   at least one electric power storage cell having a first end provided with a first electrode, and a second end provided with a second electrode;
   a first electrode bus bar that is disposed on a side of the first end of the at least one electric power storage cell and is connected to the first electrode of the at least one electric power storage cell; and
   a second electrode bus bar that is disposed on a side of the second end of the at least one electric power storage cell and is connected to the second electrode of the at least one electric power storage cell, wherein
   the first electrode bus bar is provided with a connection line that is directly connected to the first electrode,
   the first electrode bus bar and the second electrode bus bar are each configured to be joined to each other by an ultrasonic joining forming a joint portion,
   wherein the joint portion between the first electrode bus bar and the second electrode bus bar is disposed at a position that is closer to the second end of the at least one electric power storage cell than to the first end of the at least one electric power storage cell.

10. The electric power storage device according to claim 9, wherein a thickness of the first electrode bus bar is smaller than a thickness of the second electrode bus bar.

11. The electric power storage device according to claim 9, wherein:
    the first electrode bus bar includes
       a body portion that is disposed on the side of the first end of the at least one electric power storage cell, and
       an extending portion that extends from the body portion toward the second electrode bus bar and is joined to the second electrode bus bar by the ultrasonic joining; and the joint portion between the first electrode bus bar and the second electrode bus bar is formed by applying a vibration in a direction that intersects with an extending direction of the extending portion.

12. The electric power storage device according to claim 9, wherein:
the first electrode bus bar includes
a body portion that is disposed on the side of the first end of the at least one electric power storage cell, and
an extending portion that extends from the body portion toward the second electrode bus bar and is joined to the second electrode bus bar by the ultrasonic joining; and
the joint portion is formed at an end of the extending portion.

13. The electric power storage device according to claim 9, wherein:
the first electrode bus bar includes
a body portion that is disposed on the side of the first end of the at least one electric power storage cell, and
an extending portion that extends from the body portion toward the second electrode bus bar and is joined to the second electrode bus bar by the ultrasonic joining;
in the body portion, a hole is provided at a position that faces the first end of the at least one electric power storage cell;
the connection line is disposed in the hole;
the connection line includes a base portion that is connected to an inner peripheral edge of the hole; and
in the base portion, the connection line extends in a direction toward the extending portion.

14. The electric power storage device according to claim 9, wherein the first end of the at least one electric power storage cell is opposite the second end of the at least one electric power storage cell.

15. The electric power storage device according to claim 9, wherein:
the first electrode has a first polarity, and
the second electrode has an opposite second polarity.

16. The electric power storage device according to claim 9, wherein:
the first electrode bus bar is directly connected to the first electrode of the at least one electric power storage cell; and
the second electrode bus bar is directly connected to the second electrode of the at least one electric power storage cell.

* * * * *

UNITED STATES PATENT AND TRADEMARK OFFICE
CERTIFICATE OF CORRECTION

| | | |
|---|---|---|
| PATENT NO. | : 11,223,091 B2 | Page 1 of 1 |
| APPLICATION NO. | : 16/268906 | |
| DATED | : January 11, 2022 | |
| INVENTOR(S) | : Kenta Watanabe et al. | |

It is certified that error appears in the above-identified patent and that said Letters Patent is hereby corrected as shown below:

On the Title Page

Insert:
--(30) Foreign Application Priority Data
Feb. 9, 2018 (JP) ................. JP2018-021636--, therefor.

Signed and Sealed this
Twenty-sixth Day of April, 2022

Katherine Kelly Vidal
*Director of the United States Patent and Trademark Office*